Figure 1:
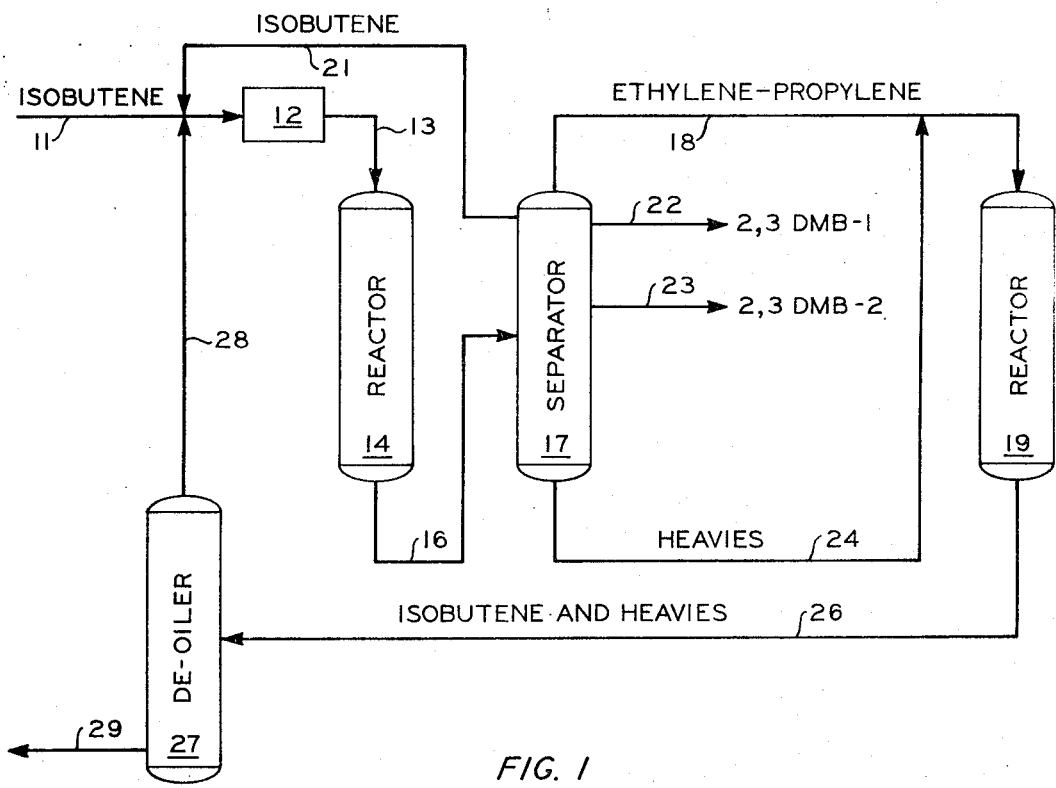

United States Patent Office 3,660,517
Patented May 2, 1972

3,660,517
CONVERSION OF OLEFINS
Robert E. Reusser and Donald L. Crain, Bartlesville, Okla., assignors to Phillips Petroleum Company
Filed Nov. 6, 1969, Ser. No. 874,147
Int. Cl. C07c 3/62
U.S. Cl. 260—683 D
1 Claim

ABSTRACT OF THE DISCLOSURE 2,3-dimethylbutene is produced by contacting isobutylene with catalyst comprising a mixture of tungsten oxide on silica and magnesium oxide. Ethylene can be added to permit the production of neohexene.

This invention relates to the conversion of olefins. In one aspect it relates to a process for converting isobutene to produce 2,3-dimethylbutenes. In another aspect it relates to a process for converting isobutene to neohexene.

Isobutylene is available as a product produced in the refining of crude oil, as a product of catalytic cracking or reforming to produce gasoline for example. Neohexene (3,3-dimethylbutene-1) is useful in the production of isoprene by cracking. Neohexene also can be used as a comonomer with other olefin monomers in the production of olefin polymers. 2,3-dimethylbutene-2 can be combined with borane ($BH_3$) to produce a selective hydroboration reagent. 2,3-dimethylbutene-1 can be used for the same purpose by isomerizing to 2,3-dimethylbutene-2. In addition neohexene, 2,3-dimethylbutene-1 and 2,3-dimethylbutene-2 can all be combined with alpha-methylstyrene (2-phenylpropene) to produce a hexamethylindane which is useful as a perfume musk.

An object of this invention is to produce 2,3-dimethylbutene. Another object of the invention is to maximize the production of 2,3-dimethylbutene from isobutene.

Other aspects, objects and the advantages of the invention are apparent in the written description, the drawing and the claims.

According to the invention 2,3-dimethylbutene is produced by contacting isobutene with a combined catalyst comprising tungsten oxide on silica mixed with magnesium oxide. The tungsten oxide on silica component of the catalyst is one which is active for converting isobutylene to 2,3-dimethylbutene. The reaction by which this occurs has variously been called "disproportionation," "the olefin reaction," "olefin dismutation," "olefin metathesis," etc. These reactions are ones which produce compounds which can be visualized as resulting from a primary reaction in which two existing unsaturated bonds between first and second carbon atoms and between third and fourth carbon atoms, respectively, are broken and two new unsaturated bonds between said first and third and between said second and fourth carbon atoms are formed.

In such catalysts the silica component can be any conventional catalyst grade silica such as precipitated silica gel, microspheroidal silica, flame hydrolyzed silica or silica aerogels or can be silica combined wtih other materials in amounts which do not change the essential characteristics of the reaction. Conventional catalyst grade silica usually has an appreciable surface area, commonly in the range of about 50 to about 700 m.$^2$/g., and can range from fine powders to coarse granules. These materials often contain small amounts of compounds of aluminum and of sodium, in the order of a few tenths of a percent by weight and smaller. Where silica is present in the silica catalyst base, reactions such as cracking and polymerization can be avoided by maintaining the alumina content below about 1 percent by weight, preferably below about .5 percent. Bases having larger amounts of alumina can be utilized in the practice of the invention but conditions should be selected to minimize undesired reactions. Such reactions can be avoided by using suitably low reaction temperatures and avoiding excessively long contact times. By careful selection of conditions, high conversion and high efficiency of the reaction can be obtained with relatively high proportions of alumina in the base, for example, bases such as silica aluminas which are conventional cracking or polymerization catalysts and even bases which have larger proportions of alumina, preferably however in amounts not greater than about 50 percent of the catalyst base.

This component of the catalyst can be prepared by incorporating into a silica containing base suitable tungsten compounds, by any suitable method such as for example, impregnation, dry mixing or coprecipitation. Among the compounds suitable are tungsten oxide and compounds convertible to the oxide upon calcination. The finished catalyst can be in the form of powders, granules, agglomerates, pellets, spheres, extrudates, and the like, depending upon the type of contacting technique employed in the reaction.

A sufficient amount of the tungsten compound is used to obtain the desired activity. Since the tungsten compounds usually are more expensive than the base material, unnecessarily large amounts are ordinarily not used. Generally, the finished catalyst contains from 0.1 percent to 30 percent by weight of the selected promoter, calculated as the metal trioxide. However, larger amounts can be used and the tungsten is assumed to be present in the finished catalyst as trioxide merely for convenience in calculation. In most instances, the amount of the promoter is from 1 percent to 20 percent by weight of the catalyst. Excellent results are obtained with catalysts containing from about 2 to 15 percent by weight of tungsten oxide. Excellent conversion and selectivity to desired products are obtained in the range of 6 to 12 percent by weight.

The tungsten oxide on silica component of the catalyst is activated by heat treatment at temperatures of from 600 to 1500° F. for a period of 1 second to 25 hours or more, shorter times being used with higher temperatures and longer times with lower temperatures. Excellent results are obtained by heat treatment of the fresh catalyst prior to introduction of the feed to convert the tungsten compound to the oxide, to dry the catalyst or otherwise activate the catalyst. A convenient and economical treatment is obtained by subjecting the catalyst to contact with a stream of air at a temperaure in the range of 900° to 1200° F. for from 15 minutes to 5 hours. Other gases which do not poison the catalyst, for example nitrogen, can also be used either as a substitute for air treatment or as a subsequent flush. Treatment with carbon monoxide or hydrogen during activation is permissible but contact of the tungsten oxide catalyst with hydrogen sulfide or sulfur dioxide is harmful. The catalyst can be activated in the presence of a hydrocarbon, for example by heating in the presence of the feed. Where the operating temperature is sufficiently high, the initial portion of the run will activate the catalyst. Air ordinarily is preferred for activation since it is readily available and does an excellent job.

Improvement can be obtained by treatment of the catalyst with a reducing gas which does not poison the catalyst for disproportionation activity and which is not otherwise undesirable. Treatment with monoxide or hydrogen can result in increased reaction rates or improved selectivity for the desired product, or both. Carbon monoxide treatment generally gives higher conversions than hydrogen treatment.

Any suitable magnesium oxide can be used as the magnesium oxide component. The material normally has a surface area of at least 1 m.$^2$/g. The magnesia can be naturally occurring, such as the mineral Brucite, or can be synthetically prepared by suitable techniques. Minor amounts of other materials such as silica, alumina, and the like, can be present, but the material is principally magnesium oxide. Depending upon the contacting technique used for the reaction, the activated magnesia can be in the form of pellets, extrudates, agglomerates, or fine powder. Before use in the process, the magnesium oxide is activated in a suitable manner such as by heating in a flowing stream of an oxygen-containing gas for about 1 to 30 hours at 500 to about 1500° F., preferably 600 to about 1000° F. After activation sometimes it is advisable to flush the catalyst with an inert gas to remove any adsorbed oxygen or other gases from the magnesium oxide.

By a suitable selection of temperature and contact time the activation of the two components of the catalyst can be done after mixing if desired.

The regeneration of the catalyst generally is done without separation of the components and generally is accomplished by a technique similar to that which is effective for activation of the mixture.

When preparing the mixture of the two components, particles of magnesium oxide and particles of the tungsten oxide promoted silica catalyst of about the same particle size can be blended. Alternatively, both magnesium oxide and tungsten oxide-silica component can be intimately blended such as by grinding and the powder then formed into other shapes such as pellets, tablets, agglomerates, extrudates, and the like, such that each particle in the catalytic zone comprises an intimate blend of the two catalysts. Other appropriate techniques for obtaining a composite catalyst can be used.

The proportion of magnesium oxide to the tungsten oxide-silica component in the composite catalyst system an vary widely. At least about 0.1 part by weight of magnesium oxide should be present for each part by weight of the tungsten oxide-silica component and there is no theoretical upper limit for the amount of magnesium oxide which can be present. Preferred ratios, however, are 0.5 to about 20 parts by weight of the tungsten oxide-silica component. About 3 parts of MgO per part of tungsten oxide-silica component give excellent results.

The conversion can be carried out at any convenient pressure up to about 2000 p.s.i.g. or higher, preferably 0 to 500 p.s.i.g., and at weight hourly space velocities (WHSV) of about 0.1 to about 1000 w./w/hr. The process can utilize any suitable contacting technique such as fixed bed reactors, fluidized bed reactors, suspended catalyst systems, and the like. The operating temperature preferably is in the range of 400° to 1100° F. Excellent results are obtained in the range of 600 to 900° F.

Further according to the invention the effluent from the conversion of isobutene to 2,3-dimethylbutene is separated to remove the dimethylbutene and products heavier and lighter than dimethylbutene are passed to a second reaction zone to convert these byproducts into additional amounts of isobutene for recycle to the isobutene conversion zone. The conversion to produce additional amounts of isobutene also proceeds according to the reaction which has variously been designated as disproportionation, the olefin reaction, olefin metathesis, and olefin dismutation and any catalyst suitable for these reactions can be utilized. Examples of such catalysts are disclosed in "Catalysis Reviews," volume 3, No. 1, pages 37–60, 1969, incorporated herein by reference. Such catalysts include for example, molybdenum or tungsten hexacarbonyl supported on alumina, molybdenum oxide, tungsten oxide or rhenium oxide supported on alumina or silica. The catalysts named above are generally designated as heterogeneneous or solid catalysts. Those catalysts known to be active for olefin disproportionation and which are homogeneous catalyst systems can also be used. Such catalysts include for example a catalyst obtained by the interaction of tungsten hexachloride, ethanol, and ethylaluminumdichloride; tungsten hexachloride and n-butyllithium; the catalyst produced by treatment of the green nitrosyl complexes $L_2Cl_2(NO)_2M$ (M=Mo or W; L=Ph$_3$P, C$_5$H$_5$N, Ph$_3$PO, etc.) with a variety of alkylaluminum halides in chlorobenzene. These catalysts hereinafter in the written description and the claims are called olefin disproportionation catalyst.

In the step in which the heavier and lighter products are converted to produce additional amounts of isobutene, conditions are selected within those suitable for the selected catalyst. These temperatures generally are in the range of about 0 to about 1200° F. Generally the pressure is not important to the reaction except to maintain the desire conditions within the reaction and to coordinate with other steps such as previous and subsequent separations, etc., but generally pressures will be in the range of about 0 to about 2000 p.s.i.g.

In the embodiment illustrated in the drawing FIG. 1 a stream comprising isobutene is fed through pipe 11 through drier percolator 12 and pipe 13 into reactor 14. Reactor 14 contains a combined catalyst comprising 1 part by weight of a tungsten oxide an silica catalyst component and 3 parts by weight of a magnesium oxide component. The stream has been heated to a temperature of 600° F. at which temperature the reaction is carried out in reactor 14. Drier percolator 12 contains a bed of magnesium oxide-mol sieve-silica gel for cleaning and drying the feed stream. In reactor 14 the isobutene feed is converted to a mixture comprising 2,3 - dimethylbutene-1, 2,3 - dimethylbutene - 2, ethylene and unconverted isobutene. In addition, heavier materials comprising oligomers of isobutene are produced along with small quantities of other materials, for example propylene. The effluent passes through pipe 16 to separation zone 17. Separation zone 17 can be a single fractionation tower as illustrated or can be a plurality of separate separators. In separation zone 17 a stream of lighter products comprising ethylene and propylene is removed overhead through pipe 18 and passed to reactor 19. A side stream of unconverted isobutene is removed through pipe 21 and returned to pipe 11 for eventual return to reactor 14. 2,3 - dimethylbutene-1 and 2,3-dimethylbutene-2 are removed through pipes 22 and 23, respectively. Heavier products are removed through pipe 24 and passed to reactor 19 along with the stream in pipe 18.

In reactor 19 the heavier products are reacted with the lighter products ethylene and/or propylene, thus producing additional amounts of isobutene. The effluent from reactor 19 is passed through pipe 26 to deoiler 27 from which an overhead stream comprising isobutene is removed through pipe 28 and returned to pipe 11 while remaining heavies are removed from the system through pipe 29.

Figure 2:
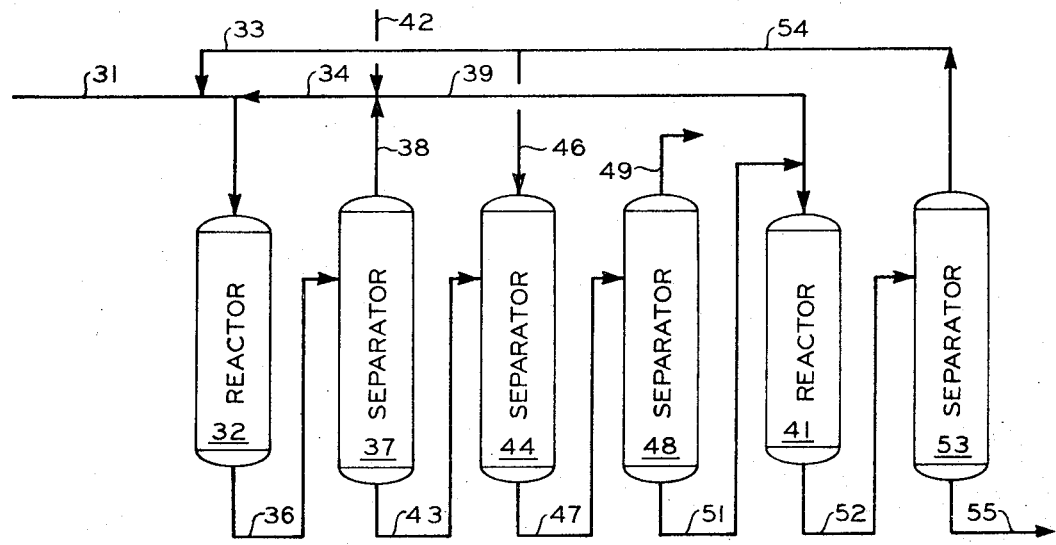

In the embodiment illustrated in the drawing, FIG. 2, a feed comprising isobutene is fed through pipe 31 and passed into reactor 32 along with recycle ethylene from pipe 34 and recycle isobutene from pipe 33. The effluent from reactor 32 comprising dimethylbutene-1, dimethylbutene-2, ethylene and susbtantial quantities of neohexene is passed through pipe 36 into separator 37. In separator 37 an overhead stream comprising ethylene is removed through pipe 38. At least a portion of this ethylene is returned through pipe 34 to reactor 32. If desired, a part of the ethylene is passed through pipe 39 to reactor 41. If necessary or desired, additional ethylene can be supplied to the system through pipe 42 or, alternatively, if there is excess ethylene produced, this can be removed from pipe 42.

The remaining products are passed from separator 37 through pipe 43 to separator 44. An overhead stream comprising isobutene is removed overhead through pipe 46 and returned through pipe 33 to reactor 32. The remaining heavier products are removed through pipe 47 and passed to separator 48. A product stream comprising neohexene and 2,3-dimethylbutene-1 and 2,3-dimethylbutene-2 is removed overhead through pipe 49. The remaining heavier products are passed through pipe 51 to reactor 41 along with ethylene from pipe 39. The effluent from reactor 41 comprising isobutene and heavier products is passed through pipe 52 to separator 53. Isobutene is removed overhead through pipe 54 and returned through pipe 33 to reactor 32 while the remaining heavies are removed through pipe 55.

EXAMPLE

A mixed catalyst system was prepared by mixing 6.80 weight parts of a WO$_3$-SiO$_2$ olefin disproportionation catalyst (containing about 8 weight percent WO$_3$) with 22.70 weight parts of a magnesium oxide catalyst. Both catalysts were −20+60 mesh in particle size. This premixed catalyst system was charged into a tubular steel fixed catalyst bed reactor and activated in place by heating at 1000° F. for 3 hours in dry flowing air, then 20 minutes more in flowing CO. The catalyst bed was then cooled to 700° F. under CO atmosphere.

Isobutene (purified by percolation over a mixture of silica gel-mole sieve-magnesia at room temperature) was then passed through the catalyst bed at 17.2 WHSV, at 700° F., and at 100 p.s.i.g.

After being on stream for about 30 minutes, the reactor effluent for the next 45 minutes was collected, sampled, and analyzed. The results of the run are shown as Run 1 in Table 1 below. For purposes of comparison, three control runs were carried out under essentially identical conditions. The results of these runs are shown in Table 1 below as Runs 2, 3, and 4.

Several additional invention runs were carried out under different reaction conditions. These are shown as Runs 5–11 in Table 1.

In Run 12 of Table 1 the isobutene feed was blended with ethylene such that the molar ratio of ethylene to isobutene was 1.73:1. Run 13 was carried out in the absence of ethylene and is used for comparison purposes to show the effect of ethylene.

Examination of Runs 1–4 in Table 1 shows the surprisingly beneficial results of including MgO in the WO$_3$-SiO$_2$ catalyst system for the conversion of isobutene to 2,3-dimethylbutenes. Comparing Run 1 with Run 2 shows that the addition of MgO to the catalyst system more than doubles the conversion and greatly increases the selectivity to the desired 2,3-dimethylbutene products. Run 4 shows that the use of MgO by itself does not contribute any products at all and illustrates that a combination of MgO and the WO$_3$-SiO$_2$ is necessary to obtain the improved results. Comparison of Run 3 with Run 1 shows that this combination of catalysts must be a mixed bed combination rather than a separate, though consecutive, bed combination.

Isobutene, of course, is a nonisomerizable olefin and it is not presently understood with certainty why the inclusion of the MgO, which has olefin double bond isomerization activity, promotes the formation of primary olefin disproportionation products.

Examination of invention Runs 5–11 shows that the present invention process is capable of improving the conversion and/or selectivity of the desired 2,3-dimethylbutene products over a variety of operating conditions.

Run 12 shows the effect of blending ethylene with the isobutene feed. Comparing Run 12 with 13 shows that the ethylene addition depresses the conversion, at these conditions, but produces a surprising amount of neohexene (3,3-dimethylbutene-1). Moreover, the neohexene is produced without significant sacrifice of the selectivity to the 2,3-dimethylbutenes.

TABLE 1

| | Catalyst system | | Reaction conditions | | | Conversion, percent | Weight percent products [1] | | |
|---|---|---|---|---|---|---|---|---|---|
| | WO$_3$-SiO$_2$ | MgO | °F. | P.s.i.g. | WHSV | | 2,3-DMB-1 | 2,3-DMB-2 | 3,3-DMB-1 |
| Run: | | | | | | | | | |
| 1 | 6.80 | 22.7 | 700 | 100 | 17.2 | 34.4 | 38.5 | 41.1 | 2.5 |
| 2 | 6.80 | 0.0 | 700 | 100 | 17.6 | 12.0 | 15.8 | 28.8 | 4.0 |
| 3 | 6.80 | [2] 22.7 | 700 | 100 | 16.5 | 18.7 | 18.2 | 36.6 | 5.0 |
| 4 | 0.0 | 22.7 | 700 | 400 | 18 | Nil | | | |
| 5 | 3.40 | 11.35 | 700 | 100 | 32 | 20.2 | 16.8 | 47.3 | 4.1 |
| 6 | 3.40 | 11.35 | 800 | 100 | 32 | 25.2 | 17.7 | 42.6 | 2.1 |
| 7 | 6.80 | 22.70 | 700 | 400 | 18 | 37 | 21.9 | 46.7 | 9.1 |
| 8 | 6.80 | 22.70 | 700 | 40 | 22 | 8.8 | 20.0 | 42.1 | 5.2 |
| 9 | 6.80 | 22.70 | 800 | 100 | 21.4 | 19.6 | 17.1 | 30.3 | 2.0 |
| 10 | 6.80 | 22.70 | 800 | 100 | 20.2 | 20.0 | 18.2 | 30.4 | 8.9 |
| 11 | 1.80 | 18.00 | 700 | 100 | [3] 13.1 | 19.1 | 23.1 | 42.7 | |
| 12 | 6.80 | 22.70 | 700 | 100 | [4] 19.4 | 7.2 | 21.5 | 39.5 | 20.2 |
| 13 | 6.80 | 22.70 | 700 | 100 | 17.6 | 21.8 | 21.2 | 44.1 | 6.0 |

[1] Other products were ethylene, propylene, polymeric material, and some unidentified products.
[2] The MgO was not intimately mixed with the WO$_3$-SiO$_2$ catalyst but was in the form of a MgO catalyst bed which immediately preceded the WO$_3$-SiO$_2$ catalyst bed within the reaction zone.
[3] Three parts n-pentane diluent/part isobutene feed was present in reaction zone.
[4] Reaction feed was 1.73:1 molar mixture of ethylene and isobutene.

That which is claimed is:
1. A process including the steps of:
   contacting isobutene with a combined catalyst comprising an effective amount of a disproportionation catalyst of tungsten oxide on silica as a first component mixed with an isomerization catalyst of magnesium oxide as a second component under conditions including conditions of temperature, pressure and contact time, suitable to produce 2,3-dimethylbutene, said conditions including a temperature in the range of 400 to 1100° F.;
   separating 2,3-dimethylbutene from the effluent from said reaction zone;
   contacting a heavier product from said effluent together with at least one lighter product from said effluent selected from the group consisting of propylene and ethylene with a catalyst active for the reaction of said heavier product and said lighter product to produce additional isobutylene; and
   returning said additional isobutylene to said reaction zone.

References Cited
UNITED STATES PATENTS

| 2,428,516 | 10/1947 | Drennan | 260—683.2 |
| 3,365,513 | 1/1968 | Heckelsberg | 260—683 |
| 3,457,320 | 7/1969 | Stapp et al. | 260—683 |
| 3,538,182 | 11/1970 | Kahn | 260—683.2 |

DELBERT E. GANTZ, Primary Examiner

C. E. SPRESSER, JR., Assistant Examiner